United States Patent [19]

Berney

[11] 4,380,963

[45] Apr. 26, 1983

[54] MOVABLE LIMIT MARKERS FOR VIEWING GLASS OF MEASURING INSTRUMENTS

[75] Inventor: Jean Berney, Les Bioux, Switzerland

[73] Assignee: Les Fabriques d'Assortiments Reunies, Le Locle, Switzerland

[21] Appl. No.: 215,859

[22] Filed: Dec. 12, 1980

[30] Foreign Application Priority Data

Dec. 14, 1979 [CH] Switzerland .................. 11076/79

[51] Int. Cl.³ ............................................. G09F 9/37
[52] U.S. Cl. .................................. 116/324; 116/296; 116/278
[58] Field of Search ............... 116/324, 323, 296, 312, 116/314, 311, 307, 309, 322, 306, 313, 302, 278; 73/709

[56] References Cited

U.S. PATENT DOCUMENTS 2,529,832 11/1950 Brietzke ........................... 116/278
3,139,854 7/1964 Hedges ............................ 116/278
3,568,631 3/1971 Skinner ........................... 116/278
3,811,404 5/1974 Possati ............................ 116/296

Primary Examiner—Edward R. Kazenske
Assistant Examiner—Denis E. Corr
Attorney, Agent, or Firm—Berger & Palmer

[57] ABSTRACT

A viewing glass used through which measurements are displayed which comprises a groove (5) having a shape parallel to the movement of an indicator needle. Displaceable markers are placed in the groove in order to denote the limiting positions of the measurements being made.

10 Claims, 2 Drawing Figures

MOVABLE LIMIT MARKERS FOR VIEWING GLASS OF MEASURING INSTRUMENTS

BACKGROUND OF THE INVENTION

The present invention is concerned with measuring instruments containing analog display means, such as having an indicator move along a graduated scale. More particularly, the invention is concerned with a viewing glass which renders the measurement more visible.

Conventional measuring instruments mostly contain an inorganic glass window, usually plane or slightly curved, of uniform clarity which is mounted in front of the display means. Furthermore, in most industrial measurements there is a need to verify whether or not the measurement is in predetermined tolerances. Thus, it would be convenient to furnish the display means with means to affix a marker which is movable and is capable of being adjusted from outside of the instrument to enable the minimum and maximum limits of the tolerance range to be easily observed.

Some instruments, such as those used for the measurement of lengths achieve this object by using two display needles to be placed to indicate the limits. This approach has problems because of high costs and because the marking needles have to be mounted with great care in the viewing glass in order to accurately remain where they have been placed. Additionally, since the position of marking needles are frictionally moved, such mechanism deteriorates with time.

SUMMARY OF THE INVENTION

Therefore it is an object of the present invention to provide a viewing glass, capable of being produced with a minimum of expense, which contains simple means of receiving and retaining one or more limit markers which are easily displaced and easily replaced and which are able to be repetitively utilized without deterioration.

These and other objects will appear more clear from the following description which illustrates the provisions of a viewing glass which contains a groove in which markers may be inserted. The viewing glass consists preferably of an acrylic resin and the markers consist of helical springs or of plastic inserts.

Additional advantages, details and characteristics of the present invention will appear from the following description of an embodiment of this invention.

DETAILED DESCRIPTION

Figure 1:
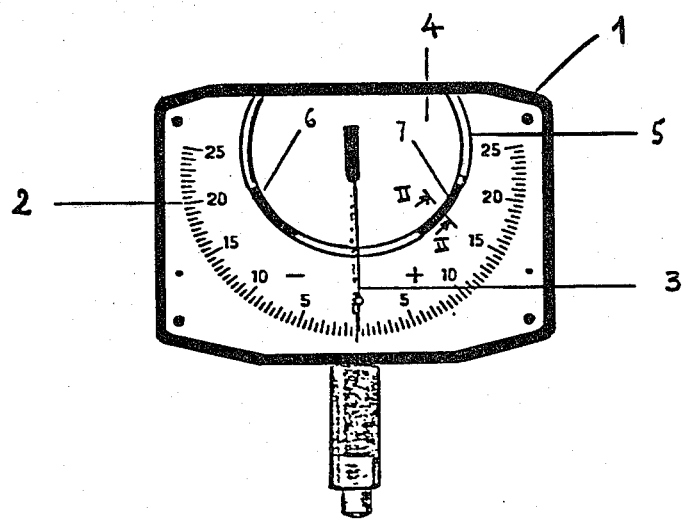
FIG. 1 is a plan view of the viewing glass of a microcomparator.

The measuring instrument 1 of FIG. 1 contains a display means consisting of a graduated scale 2 in front of which an indicator needle 3 moves, the needle being actuated by the measuring means. A viewing glass 4 on top of the scale 2 contains a groove 5 extending parallel to the graduated scale 2. Groove 5 receives displaceable markers 7 of which are inserted therein.

Figure 2:
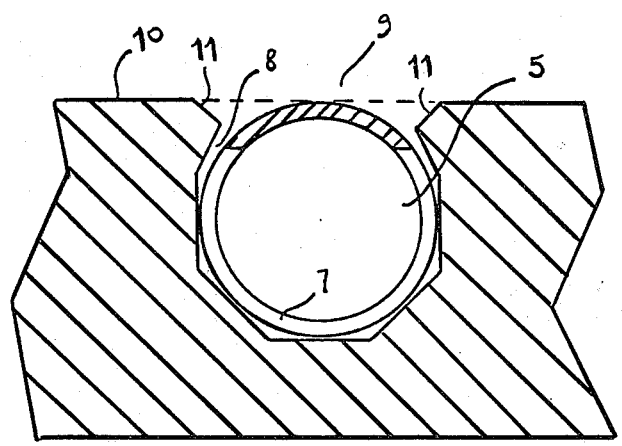
FIG. 2 is a view of the cross-section through the viewing glass along line II—II in FIG. 1.

As better seen in FIG. 2, the cross-section of the groove 5 in the viewing glass 4 shows the groove having an open mouth construction with narrowing sides or a first portion 8 which narrow towards the front 9 of the groove. This smaller front opening or first portion serves to hold the marker 7 within the groove. Narrowing sides or first portion 8 widen in the immediate vicinity of the surface 10 of the viewing glass 4 along edges or a second portion 11. Widened edges or second portion 11 permits easy introduction of the marker 7 into the groove 5 and also makes it easy for the operator to handle the marker. In order to displace the marker, the operator merely puts one finger into the opening 9 pressing it against the outer surface of this marker sliding it along the groove. The marker 7 may consist of a plastic insert or, as indicated in FIG. 2, of a helical spring. Preferably the groove is furnished with two displaceable markers, each of which allows observing the minimum and maximum tolerance limits related to a specific measurement. Each marker could be made of plastic of a different color, with a red color being used for the maximum and a green color indicating the minimum.

The viewing glass 4 may be formed of an acrylic resin into which the groove 5 may be cut my milling. It also may be made by molding a transparent synthetic resin.

Variations and modifications can, of course, be made without departing from the spirit and scope of the invention.

Having thus described my invention what I desire to secure by Letters Patent and hereby claim is:

1. Apparatus for marking limits of a measurement in which a movable display means displays a measured value,
   said apparatus comprising a viewing glass having a front surface and through which said display means is observed,
   said viewing glass comprising an open arcuate groove extending parallel to the movement of said display means, at least a first displaceable marker located in said open groove being accessible to be manually displaced in said open groove to denote said marking limits, said groove in cross-section having a first portion which narrows inwardly towards the front surface to retain said first marker and a second portion which widens outwardly from the first portion to the front surface, said at least first displaceable marker comprising a cylindrical member freely slideable along said open groove, said open groove being of such size to permit said displaceable marker to be moved by finger pressure directly applied to the displaceable marker with the displaceable marker being slid in the groove by an operator to denote the measurement limit.

2. Apparatus as claimed in claim 1, further comprising a second displaceable member being located in said open groove, said first and second displaceable markers being manually displaceable to denote the outer limits of said measurement being moved by finger pressure directly applied to said first and second displaceable markers to slide them in the groove to denote the measurement limits.

3. Apparatus as claimed in claim 1, wherein said display means comprises a pivoted needle describing an arc of travel, said open groove being parallel to said arc of travel.

4. Apparatus as claimed in claim 1, wherein said open groove comprises an open mouth shape having a front mouth portion which is narrower than the walls of said mouth, said front mouth portion retaining said first displaceable marker in said groove.

5. Apparatus as claimed in claims 1, 2 or 3, wherein said viewing glass comprises acrylic.

6. Apparatus as claimed in claims 1, 2 or 3, wherein said viewing glass comprises a synthetic material.

7. Apparatus as claimed in claims 1, 2 or 3, wherein said markers are cylindrical spring members deformable to be inserted into said open grooves and be retained therein.

8. Apparatus as claimed in claim 7, wherein said cylindrical spring members comprise a helical spring.

9. Apparatus as claimed in claims 1, 2 or 3, wherein said markers comprise plastic members.

10. Apparatus as claimed in claim 9, wherein said plastic members are colored.

* * * * *